(12) United States Patent
Smits et al.

(10) Patent No.: US 7,767,246 B2
(45) Date of Patent: Aug. 3, 2010

(54) METHOD FOR PREPARING A COFFEE EXTRACT

(75) Inventors: Joannes Hubertus Petrus Maria Smits, Oosterhout (NL); Adrianus Cornelis Maria Hellemons, Montfoort (NL)

(73) Assignee: Sara Lee/DE N.V., Utrecht (NL)

( * ) Notice: Subject to any disclaimer, the term of this patent is extended or adjusted under 35 U.S.C. 154(b) by 1191 days.

(21) Appl. No.: 11/268,682

(22) Filed: Nov. 7, 2005

(65) Prior Publication Data

US 2006/0083845 A1    Apr. 20, 2006

(30) Foreign Application Priority Data

Oct. 12, 2005  (NL)  .................................... 1030178

(51) Int. Cl.
*A23F 5/00* (2006.01)
(52) U.S. Cl. ........................ 426/594; 426/388; 426/431; 426/432
(58) Field of Classification Search ................. 426/594, 426/388, 431, 432
See application file for complete search history.

(56) References Cited

U.S. PATENT DOCUMENTS

| | | | | |
|---|---|---|---|---|
| 2,282,138 A | * | 5/1942 | Kellogg | 426/45 |
| 3,790,689 A | * | 2/1974 | Pitchon et al. | 426/434 |
| 3,810,766 A | | 5/1974 | Holzberg | |
| 3,821,434 A | * | 6/1974 | Houghton-Larsen et al. | 426/106 |
| 5,204,136 A | * | 4/1993 | Hellemons | 426/594 |
| 5,225,223 A | * | 7/1993 | Vitzthum et al. | 426/386 |
| 5,242,700 A | * | 9/1993 | Schlecht | 426/387 |

FOREIGN PATENT DOCUMENTS

| | | |
|---|---|---|
| EP | 0 097 466 | 6/1983 |
| EP | 0 352 842 | 7/1989 |
| NL | 7809885 | 9/1978 |

* cited by examiner

*Primary Examiner*—Anthony Weier
(74) *Attorney, Agent, or Firm*—Hoffman & Baron, LLP

(57) ABSTRACT

The invention relates to a method for preparing a coffee concentrate, wherein the coffee is subjected to two extractions, while the second extraction is carried out at a higher temperature than the first extraction. The method is suitable for preparing liquid as well as solid concentrates. The method produces a new concentrate that forms a further aspect of the present invention.

8 Claims, 4 Drawing Sheets

METHOD FOR PREPARING A COFFEE EXTRACT

This application claims priority based on The Netherlands application No. NL 1030178 filed on Oct. 12, 2005, which is incorporated by reference.

BACKGROUND OF THE INVENTION

The invention relates to a method for preparing a concentrated coffee extract (hereinafter: coffee concentrate), and to the extract or concentrate to be obtained therewith. In this description and in the claims, the wording "coffee concentrate" indicates a concentrated coffee extract, irrespective of this being liquid or a solid deep frozen coffee concentrate or a dried coffee concentrate, that is, instant coffee, for instance spray-dried or freeze-dried instant coffee powder. More particularly, the invention relates to a method for preparing a coffee concentrate of an improved quality, wherein roasted, ground coffee is subjected to two extractions, the second extraction being carried out at a higher temperature than the first extraction. As stated, the method is suitable for preparing liquid as well as solid concentrates. Still more particularly, the method according to the invention comprises the extraction of coffee wherein, in an initial step, aroma is captured, which aroma, later in the process is added again to the extract to be prepared. The method further provides a new coffee concentrate which forms a further aspect of the present invention. The coffee extracts obtainable according to the present invention are concentrated to form a liquid coffee concentrate and/or instant coffee, in particular instant coffee spray-dried or freeze-dried granules.

As is generally known, and also according to the present invention, coffee extracts are recovered by contacting roasted and ground coffee beans with water or an aqueous solution. On an industrial scale, the intention is to achieve an extraction efficiency which is as high as possible. This means that as many aroma substances, that is odorants and flavourings, as possible are to be extracted from the ground coffee. In the state of the art, aroma substances are recovered from roasted coffee as well as from already extracted, roasted coffee, the latter often through steam stripping.

A known method for preparing a coffee extract is described in European patent application 0 352 842. Herein, a method is described wherein a primary extract is prepared from ground, roasted coffee by exhaustive primary extraction with water or an aqueous solution in one or more extraction cells. The extraction liquid is supplied to one of the extraction cells. Then, a secondary extract is prepared through a secondary extraction with water or an aqueous liquid in one or more extraction cells. From one of these extraction cells, the secondary extract is withdrawn. When a primary extraction cell has been exhaustively extracted, usually at an atmospheric pressure or increased pressure and at a feedwater temperature between 80-100° C., this extraction cell is connected through to the secondary extraction section of the extraction battery, a series-connection of percolators. In this extraction battery, the ground coffee beans are subjected to an extraction at a higher extraction temperature, as a rule at a feedwater temperature between 120-165° C. The first fraction of secondary extract from the secondary extraction is fed to the primary extraction cell as extraction liquid. The remaining extract, the second fraction of secondary extract, obtained from the secondary extraction, is combined with the primary extract.

Before being combined with the secondary extract, the primary extract is subjected to a concentration step in which the aroma components present in the primary extract are recovered by, for instance, steam stripping; these aroma components are recovered so as not to (partially) lose them in the concentration step. Then, the combined extracts are concentrated by evaporating water, after which the recovered aroma components are added to the coffee concentrate.

The object of the present invention is to provide a method with which an improvement of the quality of the coffee concentrate and of the instant coffee can be obtained. In particular, the object of the invention is to prevent the aroma recovery step from at least the primary extract by means of steam stripping. The invention further intends to provide a method which uses less energy and requires less operations and processes. A further object is to prepare a coffee concentrate with which a better tasting and smelling coffee can be prepared.

SUMMARY OF THE INVENTION

In a first aspect, the invention relates to a method for preparing a coffee concentrate wherein roasted, ground coffee is subjected to a primary extraction with water, whereby a first primary extract is obtained with a draw-off factor of at most 2.5, preferably at most 2.0, more preferably at most 1.5 and most preferably at most 1.0, after which, optionally, a second primary extract is obtained; the primarily extracted, roasted, ground coffee is then fed to a secondary extraction section in which, with water having a feed temperature between 120 and 210° C., a secondary extract is obtained; the optional second primary extract and the secondary extract are combined and are then subjected to evaporation for obtaining a concentrated extract; and wherein this concentrated extract is combined with the first primary extract, thereby obtaining a coffee concentrate.

In this description and in the claims, "draw-off factor" is understood to mean the ratio of the mass of the extract and the mass of the dry roasted and ground coffee in the primary extraction cell. In practice, this draw-off factor is determined by a compromise between, on the one side, a sufficient degree of coffee aroma recovery in the first primary extract, and, on the other side, a lowest possible volume of the first primary extract. The draw-off factor for that matter depends on the used coarseness or degree of grinding of the roasted coffee, the extraction cell and, in particular, the number of percolators placed in series, the used water-coffee ratio, the cycle time, the feedwater temperature and the desired concentration of the end product and the like.

In a preferred embodiment, for that matter, also a second primary extract is recovered from the primary extraction cell. To that end, after draw-off and storage of the first primary extract, further extraction takes place in the primary extraction cell.

If no second primary extract is recovered, after the desired draw-off factor has been reached, the percolator comprising the first primary extract can be connected through to the secondary extraction section. In that case, the coffee components, in particular the soluble components which, normally would be recovered in the second primary extraction phase, are now recovered during the secondary extraction. In this embodiment, wherein no second primary extract is recovered, it is not possible, at least highly undesired, to use the first fraction of secondary extract as primary feedwater in the first extraction cell, in conformity with the method described in EP-A-0 352 842.

When a second primary extract is recovered, preferably, the first fraction of the secondary extract is indeed used as primary feedwater in the first extraction cell. For this embodiment, the teachings of EP-A-0 352 842 are included herein by reference.

The first primary extract obtained according to the method contains so much coffee aroma that aroma recovery from the second fraction of primary extract becomes superfluous. As indicated briefly hereinabove, it will be clear to the average skilled person that the draw-off factor for the first primary extract should not be too small because then, still too much coffee aroma is recovered in the remaining extraction steps. As a rule, here, the draw-off factor will be at least 0.05, preferably at least 0.1, and most preferably at least 0.2.

The second primary extract for that matter can indeed be subjected to aroma recovery, but this step is little effective in terms of an improved product quality for, in particular, liquid coffee concentrates. For preparing instant coffee powders, the aroma recovery from the second primary extract does bring some advantage as to product quality of the eventual product.

If no second primary extraction and no aroma recovery from the second primary extract are carried out, a savings on the use of process water and energy is realized.

Generally, after temporary, preferably cooled, storage, preferably at a temperature below 25° C., more preferably below 10° C., most preferably below 0° C., the first primary extract can directly, without further processing, be added to the intended end product. It is preferred that the first primary extract is stored as briefly as possible and cooled, preferably at an atmosphere of an inert gas such as nitrogen for adding to the intended end product; owing to these steps loss of aroma and aroma degradation reactions are limited as much as possible. The specific coffee aroma, present in the first primary extract, has a more natural coffee character compared to coffee aroma recovered by means of steam stripping from a complete primary extract.

In the method according to the invention, the primary extraction is carried out with water at a feedwater temperature which is lower than that which is used in the secondary extraction. Preferably, the temperature at which the primary extraction is carried out is between 70 and 120° C.

It is preferred that in the primary extraction, a water-coffee ratio (w/w) is used between 2.8 and 15, more preferably between 4 and 10, most preferably between 6.5 and 8.5.

The primary extraction can be carried out as an exhaustive extraction. "Exhaustive extraction" is understood to mean that extraction takes place until the extract hardly, if at all, differs from the water introduced into the extraction cell. In practice however, it will be beneficial to the efficiency of the entire process, in particular because of the subsequent concentration steps, when extraction is not exhaustive.

"Water" for that matter is understood to include customary aqueous solutions that can also be used in the known industrial extraction processes.

The primary and secondary extractions can be carried out in customary extraction cells. In a preferred embodiment, both the primary and the secondary extraction are carried out in a percolator or in percolators placed in series. In particular the secondary extraction is advantageously carried out in at least 2, and preferably at least 4 series-connected percolators. As a rule, the number of percolators used in the primary extraction section is at least 0.5 which means that during 50% of the cycle time a percolator is connected in the primary extraction section. Preferably, at least 1 or 2 percolators are connected in the primary extraction section.

The coffee concentrate obtained according to the method of the invention from a first primary extract and from concentrated secondary and, optionally, second primary extract is an organoleptically improved coffee concentrate that can be prepared even without aroma recovery steps, can be used for preparing coffee with a more natural organoleptic character. Preferably, the coffee concentrate is further subjected to a liquid-solid separation so that insoluble coffee components are separated before the coffee concentrate is packaged or is dried to form instant coffee.

In a second aspect, the invention relates to the coffee concentrate which is obtainable utilizing the method according to the invention. This product differs from all products known to the inventors and with this product a coffee can be prepared which tastes and smells better.

Presently, the invention is further illustrated with reference to FIGS. 1 and 2 which show a non-limitative flow chart for processing to from a liquid coffee concentrate and for processing to form instant coffee, respectively.

In the method according to the invention, the starting point can be a customary coffee bean raw material for industrial extraction processes, which coffee origins are roasted in the customary manner. As a rule, to that end, a mixture of different types of coffee origins is used. The roasted coffee beans are ground, while generally, for the degree of grinding a compromise is sought between obtaining the largest possible surface and obtaining a lowest possible pressure drop across the extraction cell. As a rule, the ground beans have an average size of 2.0 millimeters.

The roasted and ground coffee beans may be pre-wetted before the actual extraction process begins. The advantage of pre-wetting is that dust problems when filling the extraction cells with ground coffee are prevented. The advantage of not pre-wetting is, by contrast, that a higher aroma concentration and more dry matter end up in the first primary extract. As a rule, when pre-wetting, no more than 50% by weight of moisture based on the weight of ground beans and moisture will be added.

Thereupon, the coffee is subjected to a primary extraction. This extraction can be carried out in any conventional extraction cell or percolator. Water of a temperature between 70 and 120° C., preferably between 85 and 95° C., is used here as extraction means. Advantageously, the coffee is extracted in a cylindrical column in up-flow or according to the counterflow principle. Per cycle, as a rule, a water/coffee bean weight ratio is used between 2.8 and 15, preferably between 3 and 10, most preferably between approximately 7-8. In the method according to the invention, a cycle mostly takes up between 10 and 60 minutes, while generally, the cycle time depends on the superficial liquid velocity used in the packed coffee bed. The cycle time is defined as the time between the moment of adding a percolator with fresh coffee in a series of percolators and the moment at which the percolator is connected through from the first position to the second position; or when only one percolator is used, until this is reloaded or replaced by a percolator filled with fresh coffee.

The first primary extract that leaves the fresh extraction cell is drawn off at a draw-off factor between 0.05 and 2.5, and more preferably at a draw-off factor between 0.1 and 1. The first primary extract is of very high quality and highly concentrated; preferably, it is directly cooled to maximally 25° C., but more preferably to maximally 10° C. and most preferably to 0° C. Preferably, the primary extract is kept at an inert gas atmosphere, for instance a nitrogen atmosphere. The first primary extract contains so much coffee aroma that it can directly, without further processing (except, optionally, cooling), be added to the intended end product. Thus, and this is a great, if not the greatest advantage according to the present invention, losses of valuable, high-grade aroma components can be prevented.

This coffee aroma has a more natural coffee character compared to aroma which is recovered by means of steam stripping from a complete primary extract. In practice, the first primary extract is stored for use in cooled condition.

It is possible, however, to concentrate the first primary extract utilizing mild conditions and, in particular, low temperatures, by applying aroma conserving selective dewatering techniques such as freeze-concentration and membrane filtration and, in particular, reverse osmosis or nano filtration.

The remaining primary extract, the second primary extract, is of lower aroma, and hence sensory, quality and concentration. Optionally, this second primary extract can be subjected to a complete or partial aroma recovery, for instance by steam stripping, although, in principle, this aroma recovery from the second fraction of primary extract is superfluous. Any recovered coffee aroma is stored in cooled condition for use.

The second primary extract is concentrated, usually together with the secondary extract, to a content of soluble solids between 20 and 75%, more preferably between 25 and 70%, highly preferably between 35 and 55%.

The ground coffee subjected to primary extraction is then subjected to a secondary extraction. To that end, the primarily extracted ground coffee is connected through to a second extraction cell or extraction section.

This secondary extraction can be carried out in any conventional extraction cell or percolator train, and preferably consists of a number, preferably at least 2, more preferably at least 4, of percolators placed in series. In the secondary extraction, water with a temperature between 120 and 210° C., preferably between 150 and 180° C. is used as extraction means. Per cycle, as a rule, a water/coffee weight ratio is used between 1 and 10, preferably between 2 and 6, most preferably between approximately 4-5. Naturally, all this depends on the primary extraction circumstances used and the degree of extraction to be realized.

As stated, the secondary extract is, usually with the second primary extract if this second primary extract is recovered, combined and subjected to evaporation. Depending on the desired final concentration, the secondary extract or the combination of the second primary extract and secondary extract is concentrated in one or two steps. When the desired final concentration is between 25 and 55%, concentration in one step can take place, for instance with a so-called "falling film" evaporator. When a higher final concentration is desired, for instance between 40 and 75%, a second evaporator is added as finisher, for instance a so-called "wiped-fim" evaporator.

The twice extracted, spent coffee beans are discharged. The condensates formed in the evaporation steps are optionally (partly) reused as feedwater for the secondary extraction or, otherwise also discharged.

As stated, the first primary extract can directly be added to the end product, consisting of the evaporate, to which, also any coffee aroma formed in the aroma recovery step is added. Naturally, the skilled person will know that the amount of this first primary extract that can be added to the end product depends on the other process conditions and, in particular, on the total extraction efficiency, the conditions used for the optional aroma recovery, the concentration after the various concentration steps, the use of customary liquid or dried filler components and the desired concentration of the end product.

To said product, further also, a conventional liquid or dried filler component can be added. A filler component is sometimes used to neutralize the marked flavour character of the first primary extract to some extent.

The described steps are indicated in FIG. 1 as well as in FIG. 2. These Figures only differ in the steps which follow the mixing step, where filler component is added.

DETAILED DESCRIPTION OF THE INVENTION

Figure 1:
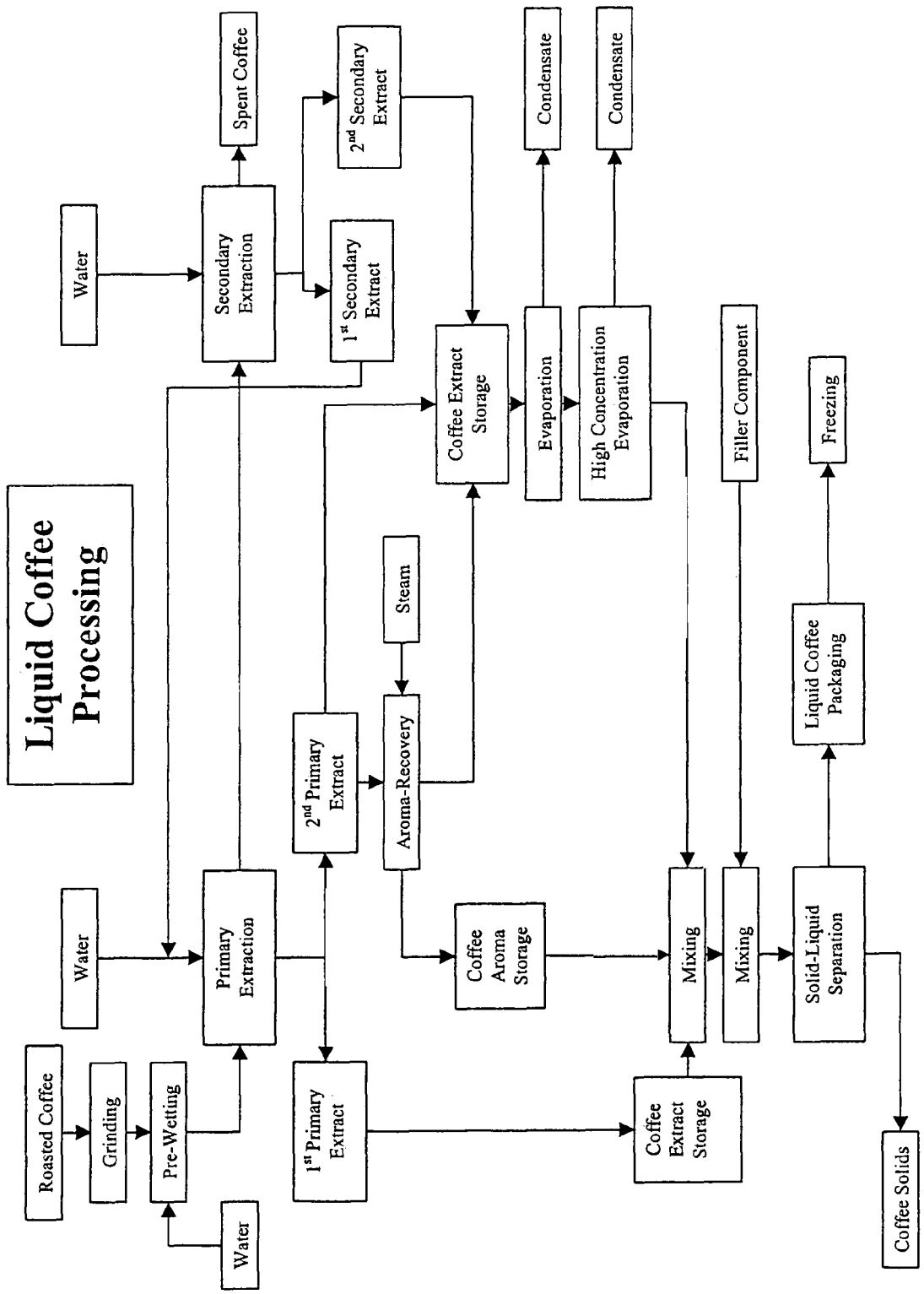
In FIG. 1, the preparation of a liquid coffee concentrate is described, To that end, the above described mixture is subjected to a liquid-solid separation, wherein the liquid coffee concentrate to be obtained is packaged and subsequently deep-frozen.
Figure 2:
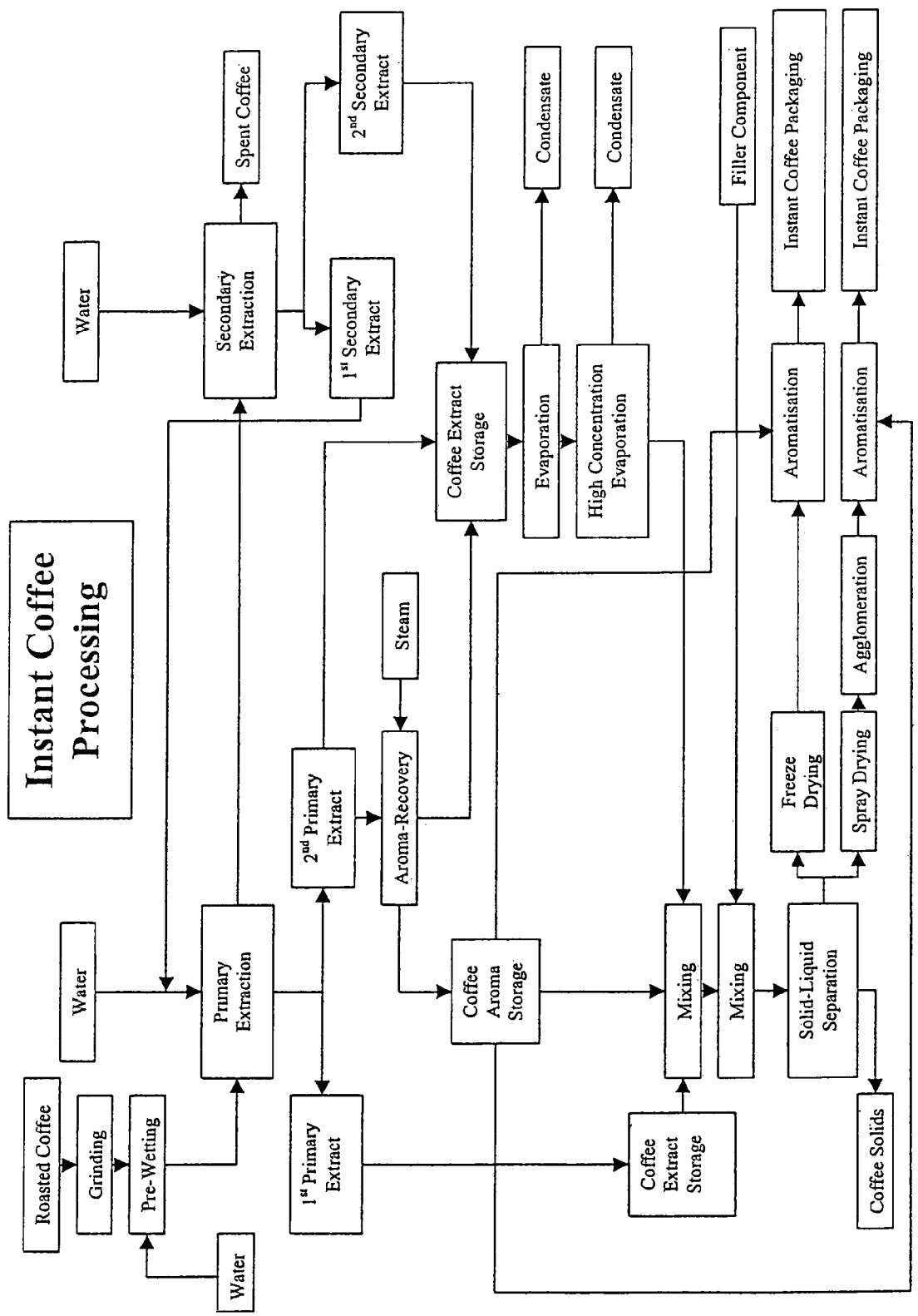
FIG. 2 shows the preparation of an instant coffee. Here, also, first a liquid-solid separation is carried out, after which the liquid phase is subjected to freeze-drying or spray-drying followed by agglomeration, both for obtaining an instant coffee powder. In this embodiment, further, optionally, aromatisation of the instant coffee powder with coffee aroma is carried out, for instance and preferably the coffee aroma recovered from the second primary extract.
Figure 3:
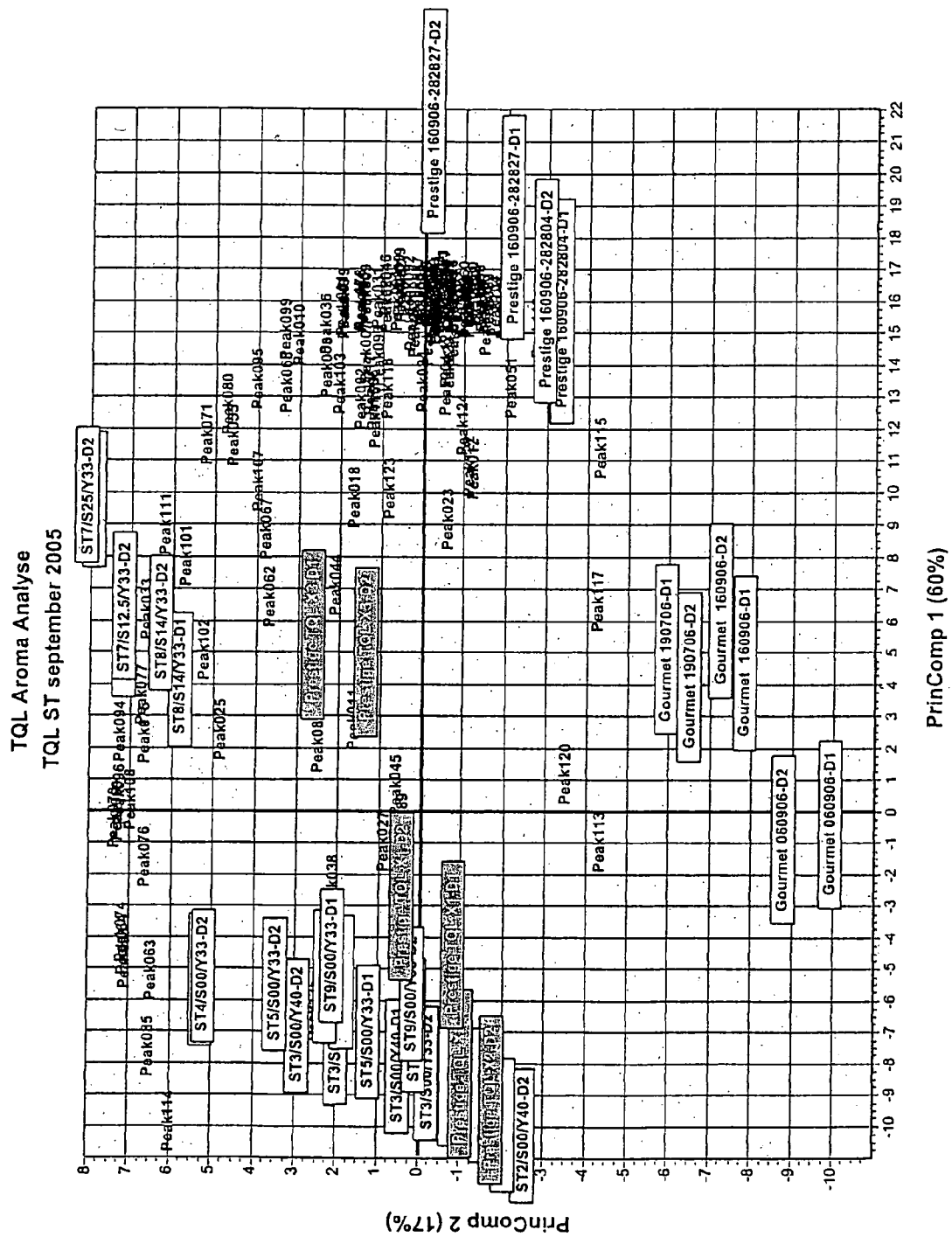
FIGS. 3 and 4 show the coffee aroma profile of the volatile components. The principal factors that form the basis for describing the individual differences in the aroma concentration between the different products are plotted in relation to each other.
Figure 4:
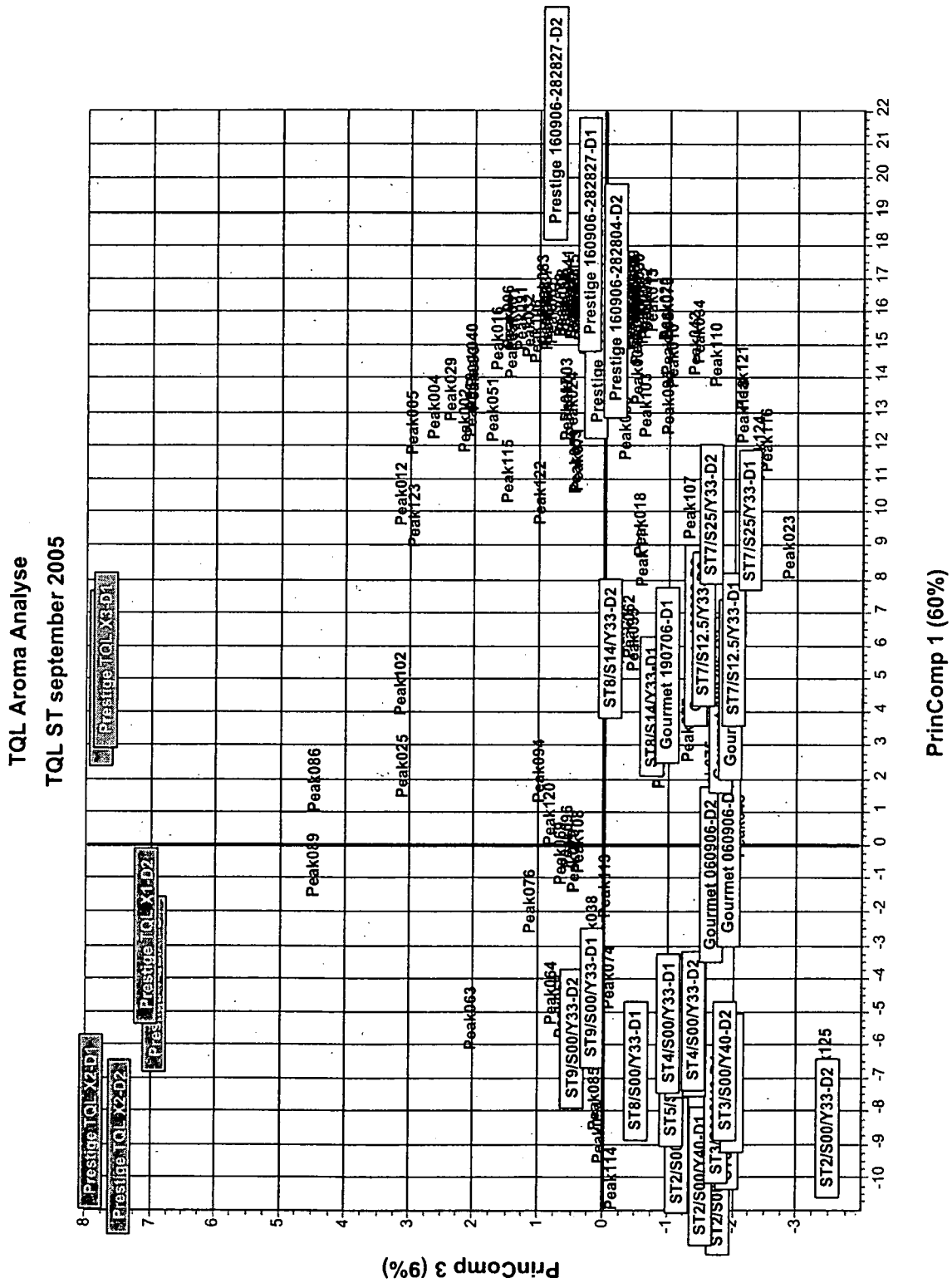

Products prepared according to the invention are subjected to an aroma analysis. In FIGS. 3 and 4, the principal factors that form the basis for describing the individual differences in the aroma concentration between the different products are plotted in relation to each other. These principal factors are calculated by means of known multivariate factor analysis. More in detail, FIGS. 3 and 4 show the coffee aroma profile of the volatile components.

The method for making such a profile is based on the so-called dynamic "headspace" technique. To that end, product is rinsed with helium gas in a closed vessel. The volatile components carried along by the helium, with boiling points below 150° C. are captured with an absorbent, and then desorbed on a cold trap. From the cold trap, injection on a gas chromatograph takes place and via capillary gas chromatography (column J&W DB-Wax, length 60 m, internal diameter 0.025 mm, 0.5 μm film thickness, Cat no 122-7063) with the aid of a known FID-detector, detection is carried out and with the aid of standards, quantification is carried out.

More in detail, the extracts and brews are filtered across a 5 μm filter. In the headspace vessel, 50 mg of dry matter and 1.25 g of sodium chloride are weighed. Optionally, water is added to 5.0 ml.

With external calibration lines, the components and their concentrations are determined and subjected to principal component analysis (PCA):

On a product, p variables $X_1, \ldots, X_p$ are measured which probably are correlated. Principal Component Analysis (PCA) is an alternative description of the original space by determining orthogonal linear combinations $Y_i = \alpha_{i1} X_1 + \ldots + \alpha_{ip} X_p$ (orthogonal means that for each i, it holds that $\alpha_{i1}^2 + \ldots + \alpha_{ip}^2 = 1$, and that $\alpha_{i1} \alpha_{j1} + \ldots + \alpha_{ip} \alpha_{jp} = 0$, for each $i \neq j$). These linear combinations are called the components.

The first principal component $Y_1$ is determined such that it has maximal variance; the second principal component $Y_2$ is perpendicular to $Y_1$ and maximizes the remaining variance. For further information, reference is made to the following publications:

H. Martens (2001). Multivariate Analysis of Quality. An Introduction, First Edition. John Wiley & Sons Ltd.;

T. W. Anderson (1984). *An Introduction to Multivariate Statistical Analysis*, Second Edition, John Wiley & Sons Ltd.; and H. Harmon (1976). *Modern Factor Analysis*, Third Edition. University of Chicago Press.

In FIGS. 3 and 4, the indication TQL refers to aroma peaks of products prepared according to the invention; the other indications refer to product prepared utilizing the method according to EP-A-0 352 842.

From the products prepared according to the invention, coffee was prepared. This coffee and the coffee concentrates were examined by an experienced panel and determined to be considerably better than the products prepared according to the method of EP-A-0 352 842. The coffee experts concluded in particular that, compared to the products obtained according to the method of EP-A-0 352,842, the products obtainable according to the method of the invention scored better on attributes such as "pure", "aromatic", "strength", "bitter" and "after taste" and worse on "caramel" and "sour".

As the taste results and the aroma analysis unequivocally point to other products than the known coffee products, the invention also relates to a coffee obtainable according to the method according to the invention.

The invention further relates to the first primary extract obtainable from the method according to the invention.

Finally, the invention is further illustrated with reference to the following, non-limitative examples. All percentages in the examples and all percentages in the description and the claims are percentages by weight, based on the weight of the total composition, unless indicated differently.

EXAMPLE 1

Preparation of Liquid Coffee Concentrate

The principle of the percolation method according to the invention is demonstrated utilizing a single bench top percolator. In the single percolator with a diameter of 15 cm, a height of 1.58 m and with a volume of 0.028 $m^3$, 8.3 kg of a mixture of coffee bones was introduced, which coffee beans (33% Colombia, 33% Peru and 34% Brasil Coffee) had been roasted to a roast loss of 15%; the beans had a moisture content of 1.6% by weight; the average degree of grinding was 2.6 mm.

Then, a primary extraction was carried out with demineralised water, wherein the water was introduced into the percolator in flow-up at a feed temperature of 95°. The total primary extraction time was 45 minutes; the water flow was 85 kg/h (water to coffee ratio was 7.5 kg/kg); the outlet pressure was 2.0 bar.

In each extraction cycle, for the first primary extract, a draw-off factor was used of 0.81 (kg/kg); 6.7 kg of a first primary extract was recovered. This extract had a soluble-solids content of 7.4%.

33.3 kg of a second primary extract was recovered. This second primary extract had a soluble-solids content of 2.8%.

Then, the extracted beans where subjected to a secondary extraction in two percolators in series, with water at a temperature of 165° C. Here, the secondary extraction efficiency was 17.5%.

The second primary extract and the secondary extract were mixed and evaporated on a centitherm CT-1 evaporator, to a concentrate with a soluble-solids content of 50%.

After evaporation, the evaporate was immediately mixed with the first primary extract.

Finally, a liquid product was obtained with a soluble-solids content of 25.1%.

The obtained coffee concentrate was examined by a group of coffee experts and described as "more coffee-like" compared to a coffee concentrate produced according to the principle described in EP-A-0 352 842.

EXAMPLE 2

Preparation of Instant Coffee

Example 1 was repeated up to and including the first primary extraction, albeit that a lower draw-off factor was used for the first primary extract of 0.54 (kg/kg); in each extraction cycle 4.5 kg of a first primary extract was recovered. This extract had a soluble-solids content of 8.1%.

Each extraction cycle, 35.5 kg of a second primary extract was recovered. This second primary extract has a soluble-solids content of 3.0%. The second primary extract was subjected to steam stripping (strip rate 0.01 kg/kg), while 0.4 kg of coffee aroma was recovered in each extraction cycle.

The secondary extraction was carried out in the same manner as in Example 1. Here, the secondary extraction efficiency was 32.5%.

The second primary extract and the secondary extract were mixed and concentrated on a centitherm CT-1 evaporator to 35%. The obtained concentrate was concentrated for a second time with a wiped film evaporator and evaporated to a highly-concentrated coffee concentrate with a dry matter content of 70% of soluble solids.

After evaporation, the evaporate was immediately mixed with the first primary extract. Thereupon, the coffee aroma recovered by steam stripping was added. Finally, a liquid coffee concentrate was obtained with a soluble-solids content of 40.1%.

The obtained coffee concentrate was subsequently freeze-dried on pilot plant scale.

The obtained freeze-dried powder was assessed by a group of coffee experts as "more coffee-like" compared to freeze-dry products which were produced according to the principle described in European patent application EP-A-0 352 842.

The invention claimed is:

1. A method for preparing a coffee concentrate, wherein roasted, ground coffee is subjected to a primary extraction with water in a primary extraction cell, whereby a first primary extract is obtained with a draw-off factor of at most 2.5, after which a second primary extract is obtained from further extraction in the primary extraction cell; the first primary extract is then fed to a secondary extraction section in which, with water having a temperature between 120 and 210° C., a secondary extract is obtained; the second primary extract and the secondary extract are combined and are then subjected to evaporation for obtaining a concentrated extract; and wherein this concentrated extract is combined with the first primary extract, thereby obtaining a coffee concentrate.

2. A method according to claim 1, wherein a first primary extract is obtained with a draw-off factor of at most 1.5.

3. A method according to claim 1, wherein a first fraction of secondary extract is used as primary feedwater in the first extraction cell.

4. A method according to claim 1, wherein the primary extraction is carried out with water at a feedwater temperature between 70 and 120° C.

5. A method according to claim 1, wherein the coffee concentrate is subjected to a liquid-solid separation, thereby obtaining a liquid coffee concentrate or, after drying, an instant coffee.

6. A method according to claim 1, wherein both the primary and the secondary extraction are carried out in a percolator.

7. A method according to claim 1, wherein the primary and/or secondary extractions are carried out in percolators placed in series.

8. A method according to claim 1, wherein a first primary extract is obtained with a draw-off factor of at most 1.0.

* * * * *